United States Patent
Chiba (10) Patent No.: US 8,680,711 B2
(45) Date of Patent: Mar. 25, 2014

(54) INVERTER BRIDGE SWITCHING POWER SOURCE UTLIZING A CAPACITOR WITH TRANSFORMER FOR MULTIPLE OUTPUTS

(75) Inventor: Akiteru Chiba, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 125 days.

(21) Appl. No.: 13/473,932

(22) Filed: May 17, 2012

(65) Prior Publication Data
US 2012/0307529 A1 Dec. 6, 2012

(30) Foreign Application Priority Data
May 30, 2011 (JP) ................................. 2011-120114

(51) Int. Cl.
*H02J 7/34* (2006.01)
(52) U.S. Cl.
USPC .................................. 307/44; 307/43; 307/46
(58) Field of Classification Search
USPC ............................................... 307/43, 44, 46
See application file for complete search history.

(56) References Cited

U.S. PATENT DOCUMENTS

| | | | | |
|---|---|---|---|---|
| 4,642,745 A | * | 2/1987 | Steigerwald et al. | 363/37 |
| 5,113,337 A | * | 5/1992 | Steigerwald | 363/98 |
| 5,684,678 A | * | 11/1997 | Barrett | 363/17 |
| 5,737,203 A | * | 4/1998 | Barrett | 363/75 |
| 6,144,190 A | * | 11/2000 | Scott et al. | 322/25 |
| 6,288,916 B1 | * | 9/2001 | Liu et al. | 363/37 |
| 6,803,677 B2 | * | 10/2004 | Algrain et al. | 307/44 |
| 2003/0178889 A1 | * | 9/2003 | Algrain et al. | 307/43 |
| 2011/0316430 A1 | * | 12/2011 | Cohen et al. | 315/161 |

FOREIGN PATENT DOCUMENTS

JP 9-233822 9/1997

* cited by examiner

*Primary Examiner* — Bao Q Vu
(74) *Attorney, Agent, or Firm* — Oblon, Spivak, McClelland, Maier & Neustadt, L.L.P.

(57) ABSTRACT

A switching power source apparatus includes a first arm including first and second switching elements, a second arm including third and fourth switching elements, a series circuit connected between a connection point of the first and second switching elements and a connection point of the third and fourth switching elements and including a capacitor and a primary winding, a rectifying-smoothing circuit that rectifies and smoothes a voltage of a secondary winding and provides an output voltage, a reactor connected to a connection point of the first and second switching elements and a DC input end, and a controller that turns on/off the first and second switching elements alternately and the third and fourth switching elements alternately and synchronizes the first and third switching elements with each other and the second and fourth switching elements with each other.

6 Claims, 12 Drawing Sheets

INVERTER BRIDGE SWITCHING POWER SOURCE UTLIZING A CAPACITOR WITH TRANSFORMER FOR MULTIPLE OUTPUTS

BACKGROUND OF THE INVENTION

1. Field of the Invention

The present invention relates to a switching power source apparatus that is highly efficient and involves a low switching loss.

2. Description of Related Art

Figure 1:
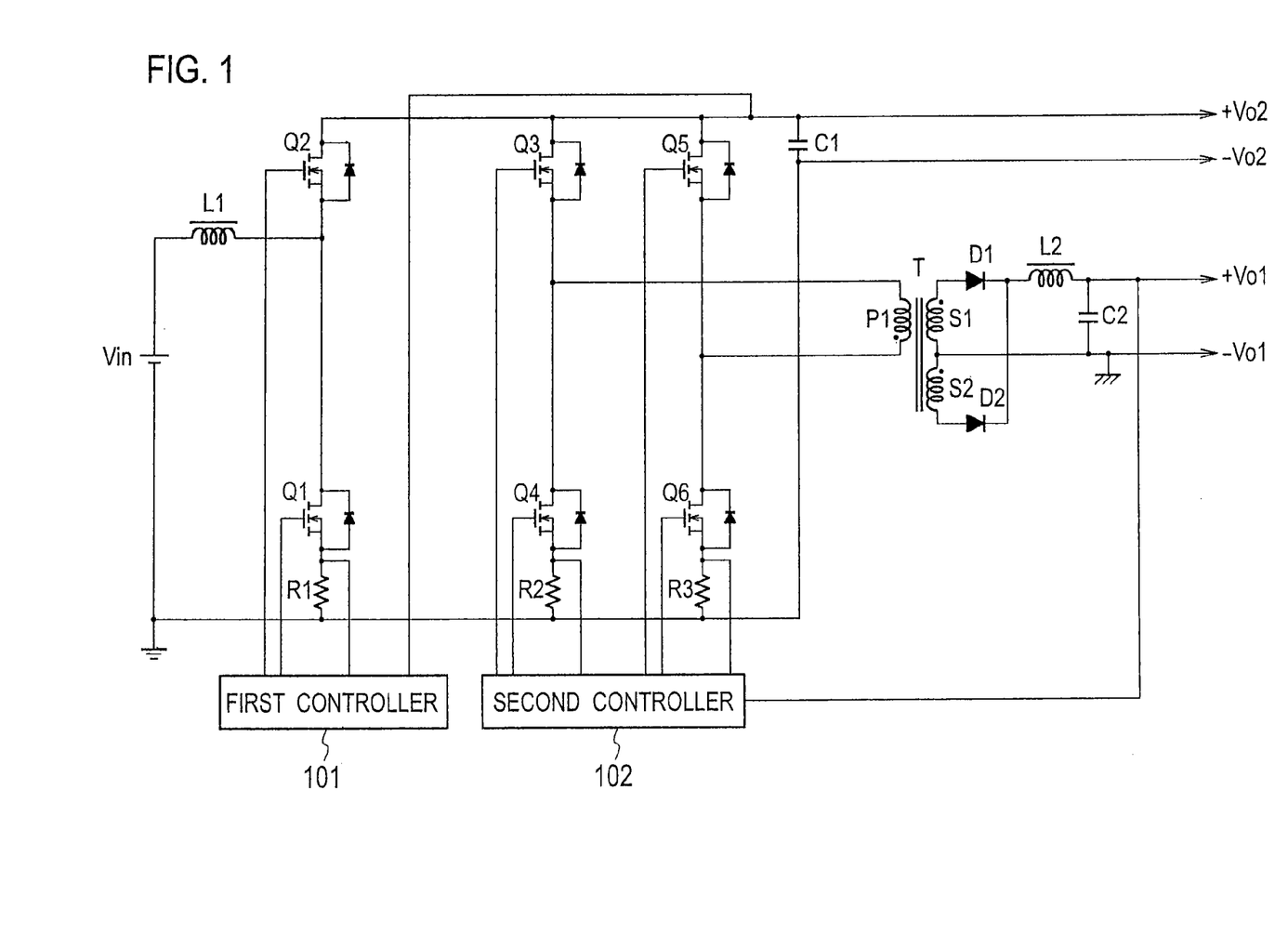
FIG. 1 is a schematic view illustrating a switching power source apparatus according to a related art.

FIG. 1 illustrates a switching power source apparatus according to a related art. This switching power source apparatus includes a step-up converter and an isolated full-bridge circuit. The step-up converter includes a DC power source Vin, a reactor L1, switching elements Q1 and Q2 of MOSFETs, a current detecting resistor R1, a capacitor C1, and a first controller 101.

According to a voltage from the capacitor C1 and a voltage from the current detecting resistor R1, the first controller 101 turns on/off the switching elements Q1 and Q2 alternately so as to provide, from both ends of the capacitor C1, a constant output voltage Vo2 that is higher than an input voltage from the DC power source Vin.

The isolated full-bridge circuit includes switching elements Q3 to Q6 that are MOSFETs, current detecting resistors R2 and R3, a primary winding P1 and secondary windings S1 and S2 of a transformer T, diodes D1 and D2, a rector L2, a capacitor C2, and a second controller 102.

According to a voltage from the capacitor C2 and voltages from the current detecting resistors R2 and R3, the second controller 102 turns on/off the switching elements Q3 and Q6 alternately and the switching elements Q4 and Q5 alternately so as to provide a constant output voltage Vo1.

With this configuration, the switching power source apparatus of FIG. 1 provides the two output voltages Vo1 and Vo2.

Another related art disclosed in Japanese Unexamined Patent Application Publication No. H09-233822 (Patent Document 1) discloses an AC-DC converter apparatus employing a three-phase inverter module.

SUMMARY OF THE INVENTION

The switching power source apparatus according to the related art of FIG. 1 must have six drivers to drive gates of the six switching elements Q1 to Q6, to complicate the apparatus and increase the cost of the apparatus.

Similarly, the related art of Patent Document 1 requires six drivers 400 as illustrated in FIG. 5 of Patent Document 1, to drive gates of the three-phase inverter module. This configuration complicates the three-phase inverter module and increases the cost thereof.

The present invention provides a switching power source apparatus that is compact, low-cost, and efficient and realizes zero-voltage switching.

According to an aspect of the present invention, the switching power source apparatus includes a first arm including a first switching element and a second switching element connected in series with the first switching element; a second arm connected in parallel with the first arm and including a third switching element and a fourth switching element connected in series with the third switching element, the first and third switching elements being diagonal to each other, the second and fourth switching elements being diagonal to each other; a first series circuit connected between a connection point of the first and second switching elements and a connection point of the third and fourth switching elements and including a first capacitor and a primary winding of a transformer connected in series with the first capacitor; a first rectifying-smoothing circuit that rectifies and smoothes a voltage of a secondary winding of the transformer and provides a first output voltage; a first reactor connected to a connection point of the first and second switching elements and one of DC input and output ends; and a control unit that turns on/off the first and second switching elements alternately, turns on/off the third and fourth switching elements alternately, synchronizes the first and third switching elements with each other, and synchronizes the second and fourth switching elements with each other.

DESCRIPTION OF PREFERRED EMBODIMENTS

Switching power source apparatuses according to embodiments of the present invention will be explained in detail with reference to the drawings.

Embodiment 1

Figure 2:
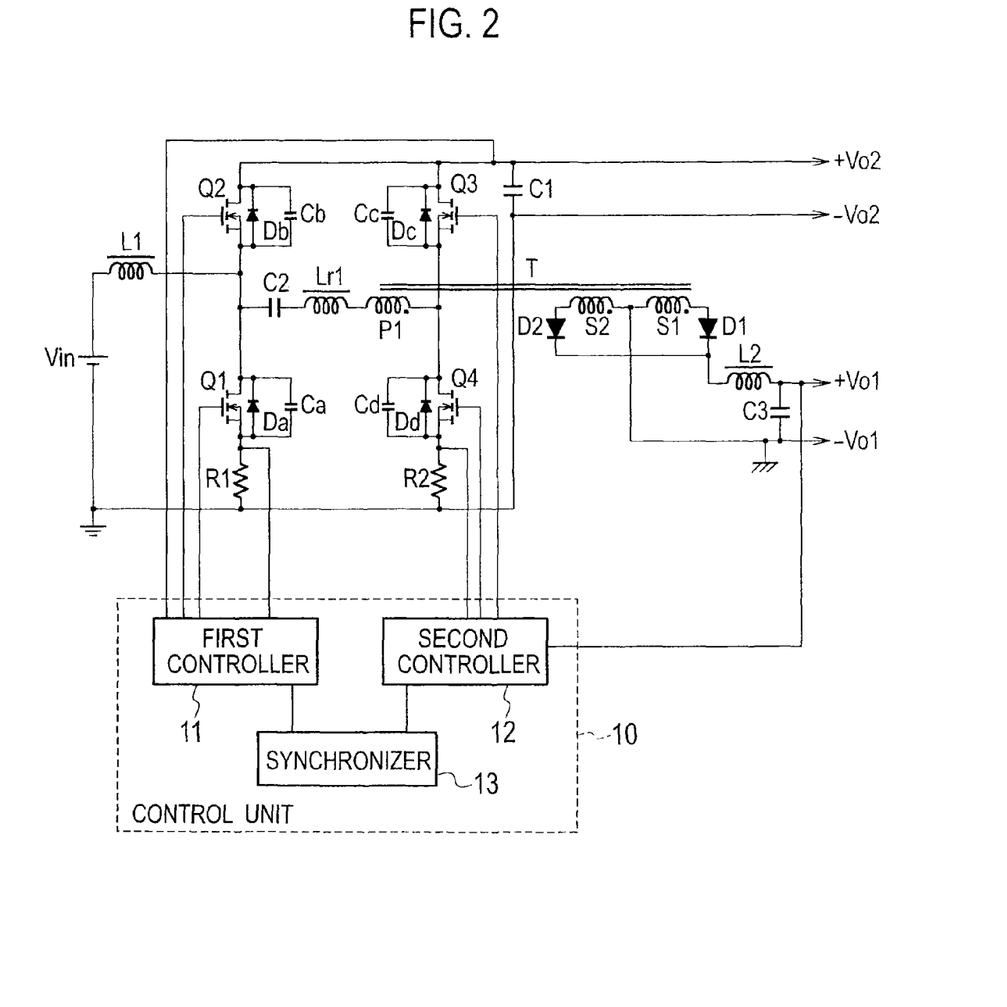
FIG. 2 is a schematic view illustrating a switching power source apparatus according to Embodiment 1 of the present invention.

FIG. 2 is a schematic view illustrating a switching power source apparatus according to Embodiment 1 of the present invention. This switching power source apparatus includes a first converter as a step-up converter and a second converter as a DC-DC converter. The first and second converters are linked to each other through a transformer T, a capacitor C2, and a reactor Lr1 with the use of gate pulses.

The first converter is a synchronous rectification step-up circuit and includes a reactor L1, a switching element Q1 serving as a main control switch, a switching element Q2 serving as an auxiliary control switch (synchronous rectification switch), a capacitor C1, and a first controller 11. The switching elements Q1 and Q2 are a first arm.

The second converter is a half-bridge forward converter and includes a switching element Q3 serving as a main control switch, a switching element Q4 serving as an auxiliary control switch (synchronous rectification switch), capacitors C2 and C3, the transformer T, diodes D1 and D2, a reactor L2, and a second controller 12. The switching elements Q3 and Q4 are a second arm.

Like the related art of FIG. 1, the switching power source apparatus according to Embodiment 1 employs a full-bridge configuration involving the switching elements Q1 to Q4. Operation of the full-bridge configuration of Embodiment 1, however, quite differs from that of the related art of FIG. 1. Namely, the full-bridge configuration of Embodiment 1 operates like a half-bridge configuration with two half-bridge parts compensating with each other to realize zero-voltage switching (ZVS).

In FIG. 2, both ends of a DC power source Vin are connected to a series circuit including the reactor L1, the switching element Q1, and a current detecting resistor R1. The switching element Q1 is connected in series with the switching element Q2.

Both ends of a series circuit including the switching elements Q1 and Q2 and the current detecting resistor R1 are connected to a series circuit including the switching elements Q3 and Q4 and a current detecting resistor R2 as well as the capacitor C1. The capacitor C1 provides an output voltage Vo2. The switching element Q3 is connected to the switching element Q2 side and the switching element Q4 is connected to the switching element Q1 side.

The switching elements Q1 to Q4 are MOSFETs. Connected between drain and source of the switching element Q1 is a parallel circuit including a diode Da and a capacitor Ca. Connected between drain and source of the switching element Q2 is a parallel circuit including a diode Db and a capacitor Cb. Connected between drain and source of the switching element Q3 is a parallel circuit including a diode Dc and a capacitor Cc. Connected between drain and source of the switching element Q4 is a parallel circuit including a diode Dd and a capacitor Cd. The diodes Da to Dd are flywheel diodes and may be parasitic diodes of the switching elements Q1 to Q4, respectively. The capacitors Ca to Cd are resonant capacitors and may be parasitic capacitors of the switching elements Q1 to Q4, respectively.

Connected between a connection point of the switching elements Q1 and Q2 and a connection point of the switching elements Q3 and Q4 is a series circuit including the capacitor C2, the reactor Lr1, and a primary winding P1 of the transformer T. The reactor Lr1 may be a leakage inductance between the primary winding P1 and secondary windings S1 and S2 of the transformer T.

The secondary windings S1 and S2 of the transformer T are connected in series. A first end of the secondary winding S1 is connected to an anode of the diode D1. A first end of the secondary winding S2 is connected to an anode of the diode D2. Cathodes of the diodes D1 and D2 are connected to a first end of the reactor L2. A second end of the reactor L2 is connected to a first end of the capacitor C3. A second end of the capacitor C3 is connected to a connection point of the secondary windings S1 and S2. The capacitor C3 provides an output voltage Vo1. The diodes D1 and D2, reactor L2, and capacitor C3 work as a rectifying-smoothing circuit.

A control unit 10 includes the first controller 11, the second controller 12, and a synchronizer 13. According to a voltage from the capacitor C1 and a voltage from the current detecting resistor R1, the first controller 11 turns on/off the switching elements Q1 and Q2 alternately, to carry out step-up control to provide the constant output voltage Vo2 higher than an input voltage of the DC power source Vin.

According to a voltage from the capacitor C3 and a voltage from the current detecting resistor R2, the second controller 12 turns on/off the switching elements Q3 and Q4 alternately to provide the constant output voltage Vo1.

Figure 4:
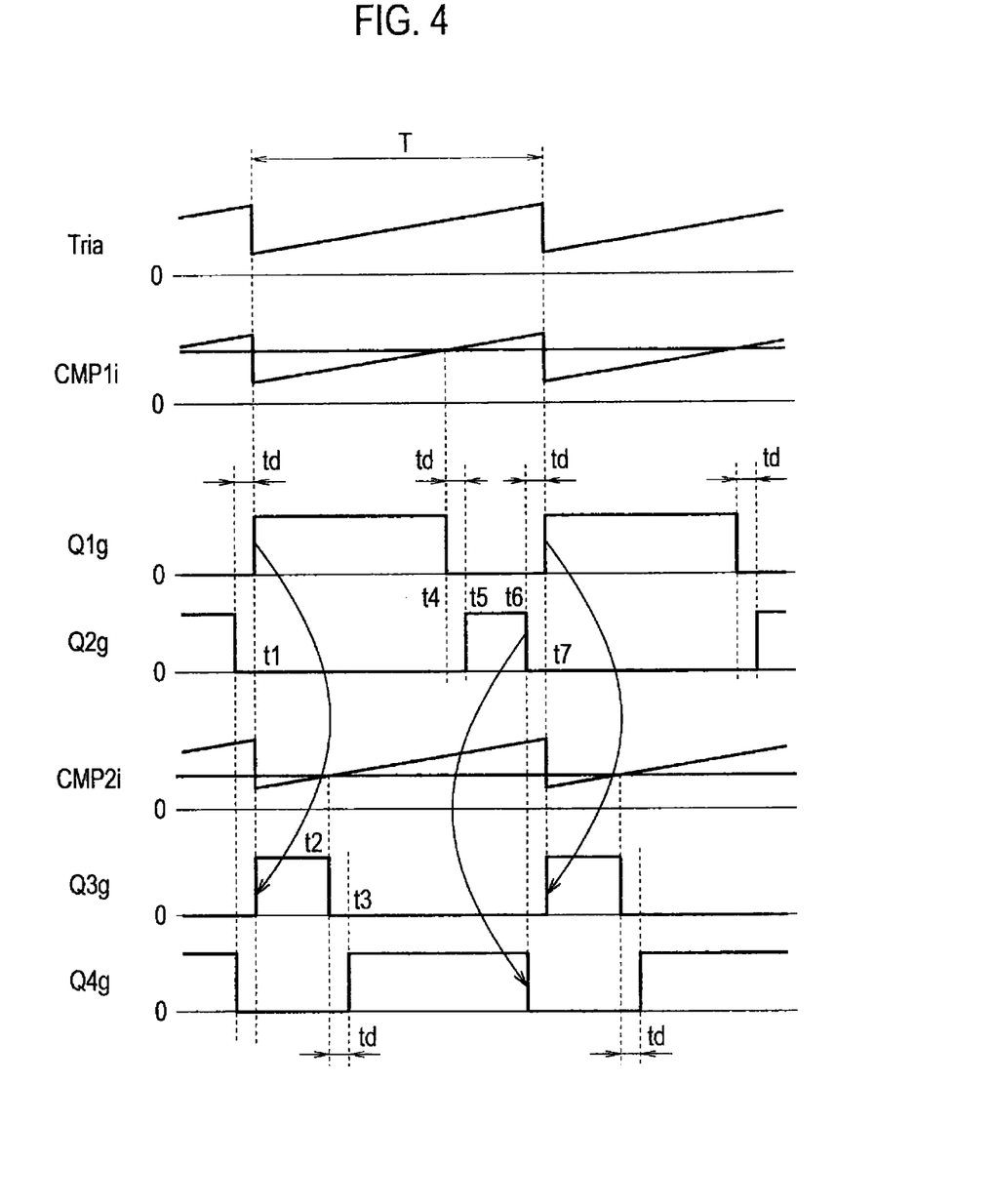
FIG. 4 is a timing chart illustrating operation at various locations in the switching power source apparatus of FIG. 2.

The synchronizer 13 synchronizes the operation timing of the first controller 11 with the operation timing of the second controller 12. More precisely, as illustrated in FIG. 4, the synchronizer 13 synchronizes a rising edge (turn-on timing) of a gate signal Q1g for the switching element Q1 with a rising edge of a gate signal Q3g for the switching element Q3 and synchronizes a falling edge (turn-off timing) of a gate signal Q2g for the switching element Q2 with a falling edge of a gate signal Q4g for the switching element Q4. Namely, the switching elements Q1 and Q3 are a diagonal pair in a full-bridge circuit and the switching elements Q2 and Q4 are another diagonal pair in the full-bridge circuit.

A midpoint of the first arm made of the switching elements Q1 and Q2 is connected to a midpoint of the second arm made of the switching elements Q3 and Q4 through the primary winding P1 of the transformer T, the reactor Lr1, and the capacitor C2, so that the switching elements Q1 to Q4 may achieve zero-voltage switching (ZVS). The zero-voltage switching is achievable because, even in an OFF period of the main control switches Q1 and Q3, a current path of a regenerative current is always secured through the synchronous rectification switches Q2 and Q4 and diodes Da and Dc.

Figure 3:
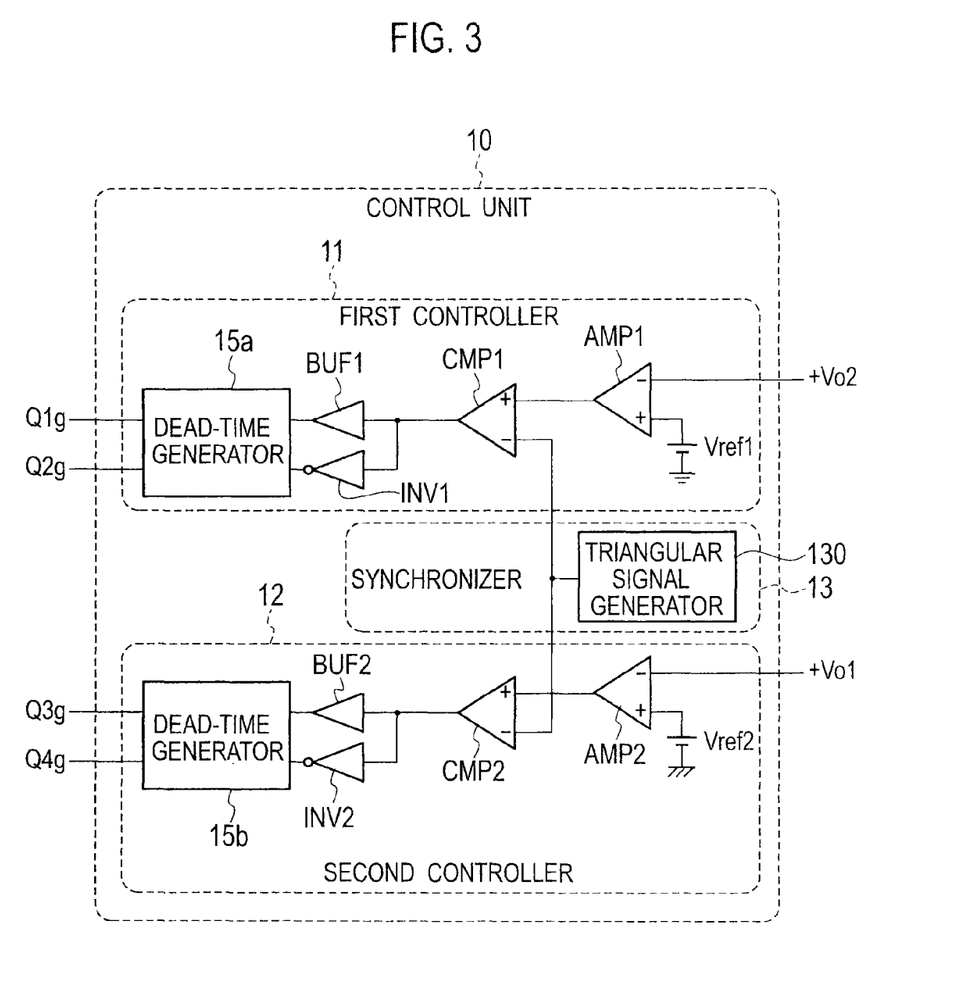
FIG. 3 is a schematic view illustrating a control unit in the switching power source apparatus of FIG. 2.

FIG. 3 is a schematic view illustrating the control unit (controller) 10 of the switching power source apparatus according to Embodiment 1 and FIG. 4 is a timing chart illustrating operation at various locations in the switching power source apparatus. In the control unit 10 of FIG. 3, the first controller 11 includes an error amplifier AMP1, a comparator CMP1, a buffer BUF1, an inverter INV1, and a dead-time generator 15a. The second controller 12 includes an error amplifier AMP2, a comparator CMP2, a buffer BUF2, an inverter INV2, and a dead-time generator 15b. The synchronizer 13 includes a triangular signal generator 130.

The error amplifier AMP1 amplifies an error voltage between the output voltage Vo2 from the capacitor C1 and a reference voltage Vref1 and outputs an error amplified signal EAS1 to a non-inverting input terminal (+) of the comparator CMP1. The error amplifier AMP2 amplifies an error voltage between the output voltage Vo1 from the capacitor C3 and a reference voltage Vref2 and outputs an error amplified signal EAS2 to a non-inverting input terminal (+) of the comparator CMP2.

The triangular signal generator 130 generates a triangular signal Tria and supplies the triangular signal Tria to inverting input terminals (−) of the comparators CMP1 and CMP2.

If the error amplified signal EAS1 from the error amplifier AMP1 is equal to or greater than the triangular signal Tria from the triangular signal generator 130, the comparator CMP1 outputs a high-level signal to the buffer BUF1 and inverter INV1. If the error amplified signal EAS1 is lower than the triangular signal Tria, the comparator CMP1 outputs a low-level signal to the buffer BUF1 and inverter INV1.

If the error amplified signal EAS2 from the error amplifier AMP2 is equal to or greater than the triangular signal Tria from the triangular signal generator 130, the comparator CMP2 outputs a high-level signal to the buffer BUF2 and inverter INV2. If the error amplified signal EAS2 is lower than the triangular signal Tria, the comparator CMP2 outputs a low-level signal to the buffer BUF2 and inverter INV2.

The buffer BUF1 provides the dead-time generator 15a with the output of the comparator CMP1. The inverter INV1 inverts the output of the comparator CMP1 and provides the dead-time generator 15a with the inverted signal. The dead-time generator 15a delays the signal from the buffer BUF1 by a predetermined time and generates a gate signal Q1g to be supplied to a gate of the switching element Q1. The dead-time generator 15a delays the signal from the inverter INV1 by the predetermined time and generates a gate signal Q2g to be supplied to a gate of the switching element Q2.

The buffer BUF2 provides the dead-time generator 15b with the output of the comparator CMP2. The inverter INV2 inverts the output of the comparator CMP2 and provides the dead-time generator 15b with the inverted signal. The dead-time generator 15b delays the signal from the buffer BUF2 by the predetermined time and generates a gate signal Q3g to be supplied to a gate of the switching element Q3. The dead-time generator 15b delays the signal from the inverter INV2 by the predetermined time and generates a gate signal Q4g to be supplied to a gate of the switching element Q4.

Figure 5:
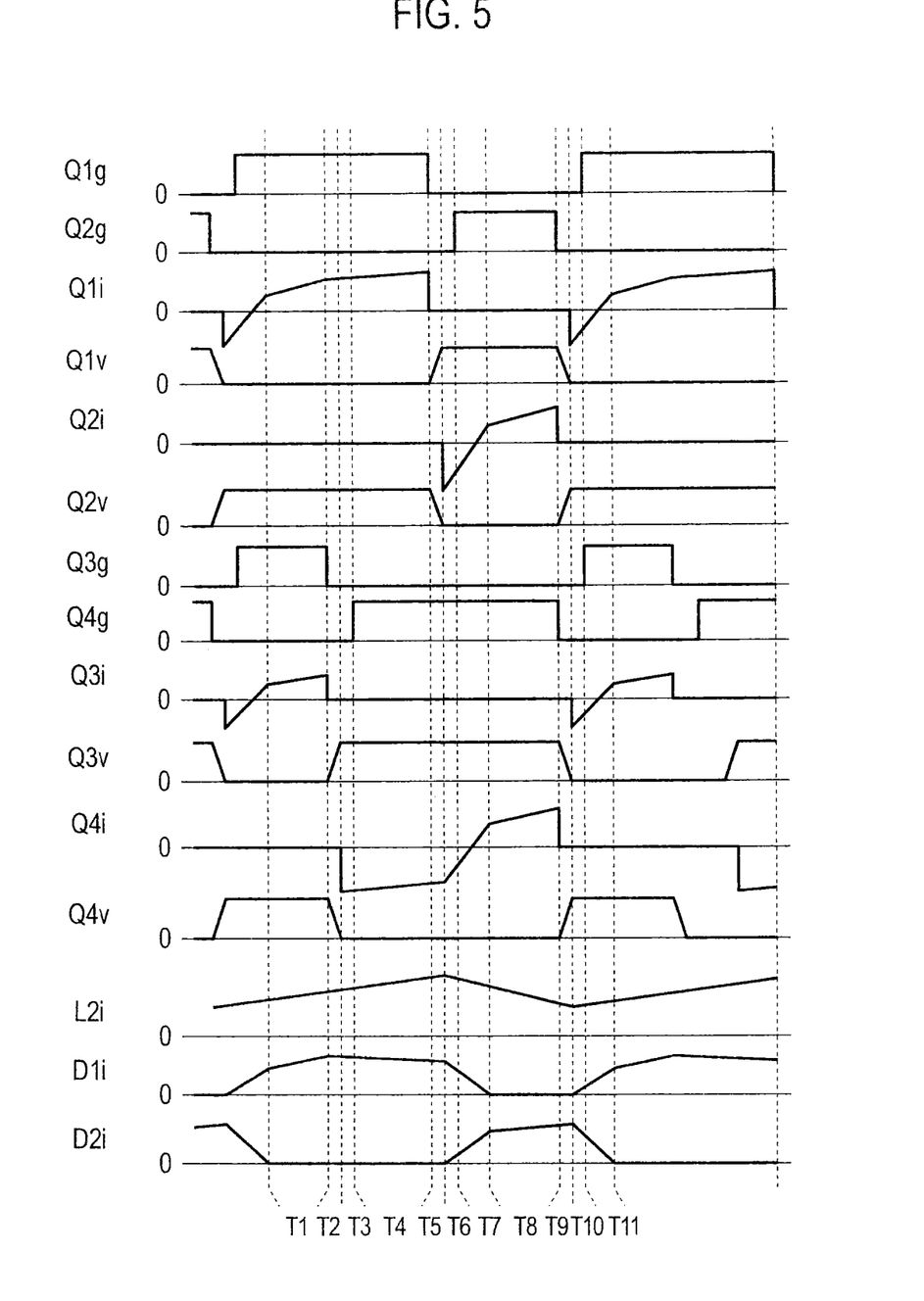
FIG. 5 is a timing chart illustrating operation at various locations in the switching power source apparatus of FIG. 2 when the ON duty of a first converter is greater than that of a second converter in the switching power source apparatus.
Figure 6:
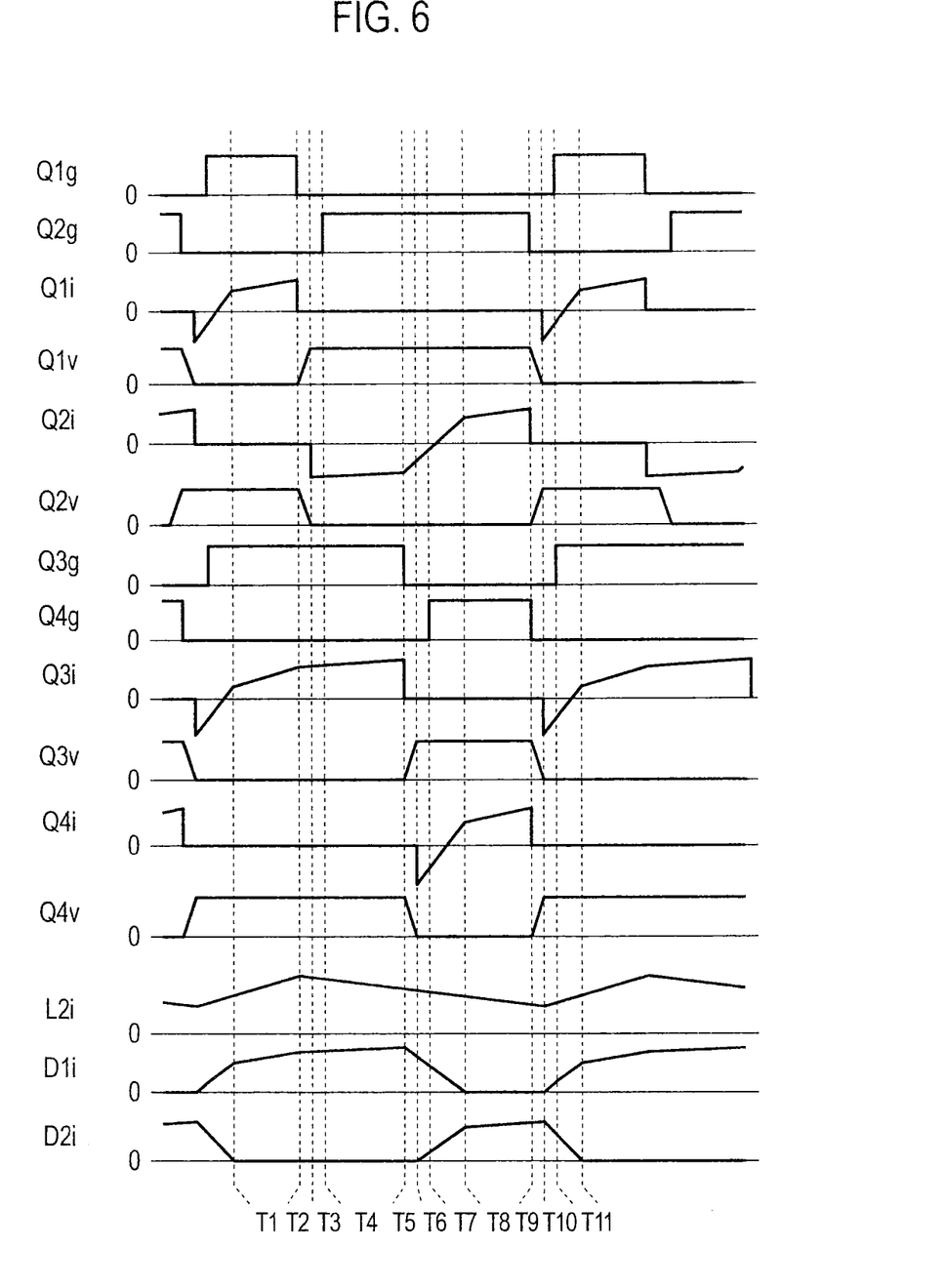
FIG. 6 is a timing chart illustrating operation at various locations in the switching power source apparatus of FIG. 2 when the ON duty of the first converter is smaller than that of the second converter in the switching power source apparatus.
Figure 7:
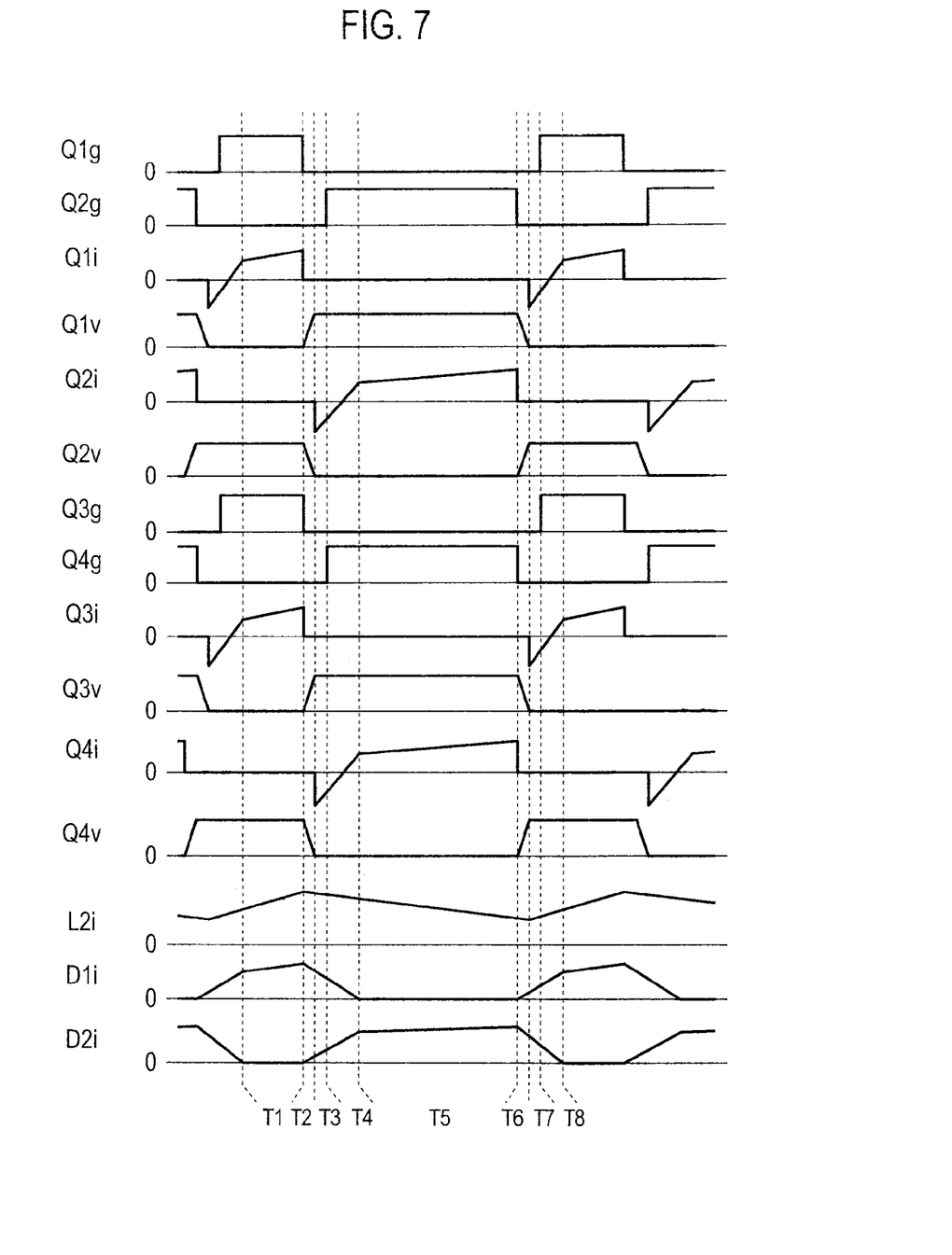
FIG. 7 is a timing chart illustrating operation at various locations in the switching power source apparatus of FIG. 2 when the ON duty of the first converter is equal to that of the second converter in the switching power source apparatus.

Operation of the switching power source apparatus according to Embodiment 1 will be explained in detail with reference to FIGS. 5 to 7.

The first converter of the switching power source apparatus has an ON duty of duty1 and the second converter thereof has an ON duty of duty2. There are cases such as of (i) duty1>duty2, (ii) duty1<duty2, and (iii) duty1=duty2 that involve different regenerative current paths, and therefore, operation of each of the cases will be explained in detail.

The following explanation is mainly made in connection with operation on the primary side of the transformer T. When a switching element is turned on in a zero-voltage switching mode, the switching element may involve a plurality of current paths. For example, in a period T9, the switching element Q1 involves two overlapping current paths and the switching element Q3 involves one current path, and therefore, a discharge time of the capacitor Ca of the switching element Q1 differs from that of the capacitor Cc of the switching element Q3. The difference in the discharge time, however, is very small. To avoid complexity, the following explanation assumes that the capacitors Ca and Cc simultaneously discharge and the diodes Da and Dc simultaneously allow to cause currents.

(i) Operation Under Condition of duty1>duty2

Operation of the switching power source apparatus according to Embodiment 1 when the ON duty duty1 of the first converter of the apparatus is greater than the ON duty duty2 of the second converter of the apparatus will be explained with reference to the timing chart of FIG. 5.

In a period T1, the switching element Q1 is ON due to the gate signal Q1g and a current Q1i passes through a path extending along Vin, L1, Q1, R1, and Vin in a clockwise manner, thereby exciting the reactor L1. At this time, the switching element Q3 is also ON due to the gate signal Q3g and a current Q3i passes through a path extending along C1, Q3, P1, Lr1, C2, Q1, R1, and C1 in a counterclockwise manner, thereby exciting the reactor Lr1 in this direction. The switching element Q1 allows a sum current of the exciting current of the reactor L1 and the current Q3i of the switching element Q3.

A period T2 is a dead-time period. In the period T2, the switching element Q1 is ON and the current Q1i passes through the path extending along Vin, L1, Q1, R1, and Vin, thereby exciting the reactor L1. At this time, the switching element Q3 turns off and the reactor Lr1 starts discharging the excitation energy thereof, to discharge the capacitor Cd of the switching element Q4. The reactor Lr1 and the capacitor Cd of the switching element Q4 resonate to decrease a drain voltage Q4v of the switching element Q4. At this time, the current Q1i counterclockwise passes through a path extending along Lr1, C2, Q1, R1, R2, Cd of Q4, P1, and Lr1.

A period T3 is a dead-time period. In the period T3, the switching element Q1 keeps ON and the current Q1i clockwise passes through the path extending along Vin, L1, Q1, R1, and Vin, thereby exciting the reactor L1. The reactor Lr1 discharges the excitation energy thereof, to discharge the capacitor Cd of the switching element Q4 and make the potential of the switching element Q4 negative. When the negative potential of the switching element Q4 reaches a forward voltage of the diode Dd of the switching element Q4, the diode Dd starts to allow a current counterclockwise passing through a path extending along Lr1, C2, Q1, R1, R2, Dd of Q4, P1, and Lr1.

In a period T4, the switching element Q1 is continuously ON and the current Q1i passes through the path extending along Vin, L1, Q1, R1, and Vin, thereby exciting the reactor L1. The switching element Q4 turns on due to the gate signal Q4g and a current Q4i passes through a path extending along Lr1, C2, Q1, R1, R2, Q4, P1, and Lr1. Namely, the switching element Q4 achieves zero-voltage switching (ZVS). At this time, the discharge energy of the reactor Lr1 is regenerated into this path.

A period T5 is a dead-time period. In the period T5, the switching element Q1 turns off and the reactor L1 starts to discharge the excitation energy thereof. At this time, a current passes through a path extending along Vin, L1, Cb of Q2, C1, and Vin. The path of the discharge energy of the reactor Lr1 shifts to Lr1, C2, Cb of Q2, C1, R2, Q4, P1, and Lr1.

A period T6 is a dead-time period. In the period T6, the capacitor Cb of the switching element Q2 discharges and the switching element Q2 has negative potential. When the negative potential reaches a forward voltage of the diode Db of the switching element Q2, the diode Db allows to cause a current passing through a path extending along Vin, L1, Db of Q2, C1, and Vin. At this time, the path of the discharge energy of the reactor Lr1 shifts to Lr1, C2, Cb of Q2, C1, R2, Q4, P1, and Lr1.

In a period T7, the switching element Q2 turns on and allows to cause a current Q2i passing through a path extending along Vin, L1, Q2, C1, and Vin. Namely, the switching element Q2 achieves zero-voltage switching (ZVS). The current Q2i also passes through a second current path extending along Lr1, C2, Q2, C1, R2, Q4, P1, and Lr1. Thereafter, the polarity of the second current path inverts due to resonance between the reactor Lr1 and the capacitor C2, and therefore, the second current path shifts to Lr1, P1, Q4, R2, C1, Q2, C2, and Lr1.

In a period T8, the switching element Q2 is continuously ON and the current Q2i clockwise passes through the path extending along Vin, L1, Q2, C1, and Vin. The current Q2i also passes through the second current path extending along Lr1, C2, Q2, C1, R2, Q4, P1, and Lr1, thereby exciting the reactor Lr1.

In a period T9, the switching elements Q2 and Q4 turn off and the reactor Lr1 starts to discharge the excitation energy thereof and a current clockwise passes through a path extending along Vin, L1, C2, Lr1, P1, Cc of Q3, C1, and Vin. Also, a current clockwise passes through a path extending along Lr1, P1, Cc of Q3, C1, R1, Ca of Q1, C2, and Lr1.

In a period T10, the capacitors Ca and Cc of the switching elements Q1 and Q3 discharge to make the potential of the switching elements Q1 and Q3 negative. When the negative potential reaches forward voltages of the diodes Da and Dc of the switching elements Q1 and Q3, the diodes Da and Dc allow to cause currents. At this time, a current clockwise passes through a path extending along Vin, L1, C2, Lr1, P1, Cc of Q3, C1, and Vin. Also, a current clockwise passes through a path extending along Lr1, P1, Cc of Q3, C1, R1, Ca of Q1, C2, and Lr1.

In a period T11, the switching elements Q1 and Q3 turn on. When the switching element Q1 turns on, the reactor L1 that has been discharging the energy thereof starts to be excited with the DC power source Vin. At this time, a current passes through the path extending along Vin, L1, Q1, R1, and Vin. Also, a current passes through a second current path extending along Lr1, P1, Q3, C1, R1, Q1, C2, and Lr1. Namely, the switching elements Q1 and Q3 achieve zero-voltage switching (ZVS). Thereafter, the reactor Lr1 and capacitor C2 resonate to invert the polarity of the second current path, and therefore, the second current path shifts to Lr1, C2, Q1, R1, C1, Q3, P1, and Lr1.

(ii) Operation Under Condition of duty1<duty2

Operation of the switching power source apparatus according to Embodiment 1 when the ON duty duty1 of the first converter of the apparatus is smaller than the ON duty duty2 of the second converter of the apparatus will be explained with reference to the timing chart of FIG. 6.

In a period T1, the switching element Q1 is ON due to the gate signal Q1g and a current Q1i clockwise passes through the path extending along Vin, L1, Q1, R1, and Vin, thereby exciting the reactor L1. At this time, the switching element Q3 is also ON due to the gate signal Q3g and a current Q3i counterclockwise passes through the path extending along C1, Q3, P1, Lr1, C2, Q1, R1, and C1, thereby exciting the reactor Lr1 in this direction. The switching element Q1 allows a sum current of the exciting current of the reactor L1 and the current Q3i of the switching element Q3.

In a period T2, the switching element Q1 turns off and the switching element Q3 is continuously ON. At this time, the discharged energy of the reactors L1 and Lr1 starts to discharge the capacitor Cb of the switching element Q2, to cause a current clockwise passing through the path extending along Vin, L1, Cb of Q2, C1, and Vin and the current Q3i through the path extending along Lr1, C2, Cb of Q2, Q3, P1, and Lr1.

In a period T3, the capacitor Cb of the switching element Q2 discharges and the switching element Q2 has negative potential. When the negative potential reaches the forward voltage of the diode Db of the switching element Q2, the diode Db allows to cause a current passing through the path extending along Vin, L1, Db of Q2, C1, and Vin. Also, a current clockwise passes through a path extending along Lr1, C2, Db of Q2, Q3, P1, and Lr1.

In a period T4, the switching element Q2 turns on and allows to cause a current Q2i passing through the path extending along Vin, L1, Q2, C1, and Vin. Namely, the switching element Q2 achieves zero-voltage switching (ZVS). Also, the currents Q2i and Q3i pass through a path extending along Lr1, C2, Q2, Q3, P1, and Lr1.

In a period T5, the switching element Q3 turns off, the reactor L1 starts to discharge the excitation energy thereof, and a current clockwise passes through the path extending along Vin, L1, Q2, C1, and Vin. At this time, the discharged energy of the reactor Lr1 causes a current clockwise passing through a path extending along Lr1, C2, Q2, C1, R2, Cd of Q4, P1, and Lr1, thereby discharging the capacitor Cd of the switching element Q4.

In a period T6, the capacitor Cd of the switching element Q4 discharges to make the potential of the switching element Q4 negative. When the negative potential reaches the forward voltage of the diode Dd of the switching element Q4, the diode Dd allows to cause a current passing through the path extending along Vin, L1, Q2, C1, and Vin. Also, a current passes through a path extending along Lr1, C2, Q2, C1, R2, Dd of Q4, P1, and Lr1.

In a period T7, the switching element Q4 turns on and a current clockwise passes through the path extending along Vin, L1, Q2, C1, and Vin. Also, a current clockwise passes through a second current path extending along Lr1, C2, Q2, C1, R2, Q4, P1, and Lr1. Namely, the switching element Q4 achieves zero-voltage switching (ZVS). Thereafter, the reactor Lr1 and capacitor C2 resonate to invert the polarity of the second current path, so that a current counterclockwise passes through the second current path along Lr1, P1, Q4, R2, C1, Q2, C2, and Lr1.

In a period T8, the switching elements Q2 and Q4 are continuously ON and a current clockwise passes through the path extending along Vin, L1, Q2, C1, and Vin. Also, a current counterclockwise passes through the second current path extending along Lr1, P1, Q4, R2, C1, Q2, C2, and Lr1, to excite the reactor Lr1.

In a period T9, the switching elements Q2 and Q4 turn off, the reactor Lr1 starts to discharge the excitation energy thereof, and a current clockwise passes through the path extending along Vin, L1, C2, Lr1, P1, Cc of Q3, C1, and Vin. Also, a current clockwise passes through the path extending along Lr1, P1, Cc of Q3, C1, R1, Ca of Q1, C2, and Lr1.

In a period T10, the capacitors Ca and Cc of the switching elements Q1 and Q3 discharge to make the potential of the switching elements Q1 and Q3 negative. When the negative potential reaches the forward voltages of the diodes Da and Dc of the switching elements Q1 and Q3, the diodes Da and Dc allows to cause currents. At this time, a current clockwise passes through the path extending along Vin, L1, C2, Lr1, P1, Cc of Q3, C1, and Vin. Also, a current clockwise passes through the path extending along Lr1, P1, Cc of Q3, C1, R1, Ca of Q1, C2, and Lr1.

In a period T11, the switching elements Q1 and Q3 turn on. When the switching element Q1 turns on, the reactor L1 that has been discharging the energy thereof starts to be excited with the DC power source Vin. At this time, a current clockwise passes through the path extending along Vin, L1, Q1, R1, and Vin. Also, a current clockwise passes through a second current path extending along Lr1, P1, Q3, C1, R1, Q1, C2, and Lr1. Namely, the switching elements Q1 and Q3 achieve zero-voltage switching (ZVS). Thereafter, the reactor Lr1 and capacitor C2 resonate to invert the polarity of the second current path, and therefore, a current counterclockwise passes along Lr1, C2, Q1, R1, C1, Q3, P1, and Lr1.

(iii) Operation Under Condition of duty1=duty2

Operation of the switching power source apparatus according to Embodiment 1 when the ON duty duty1 of the first converter of the apparatus is equal to the ON duty duty2 of the second converter of the apparatus will be explained with reference to the timing chart of FIG. 7.

In a period T1, the switching element Q1 is ON due to the gate signal Q1g and allows to cause a current Q1i clockwise passing through the route extending along Vin, L1, Q1, R1, and Vin, thereby exciting the reactor L1. At this time, the switching element Q3 is also ON due to the gate signal Q3g and allows to cause a current Q3i counterclockwise passing through the route extending along C1, Q3, P1, Lr1, C2, Q1, R1, and C1, thereby exciting the reactor Lr1 in this direction. The switching element Q1 causes a sum current of the exciting current of the reactor L1 and the current Q3i of the switching element Q3.

In a period T2, the switching elements Q1 and Q3 simultaneously turn off and the reactors L1 and Lr1 start to discharge their excitation energy. At this time, a current clockwise passes through the path extending along Vin, L1, Cb of Q2, C1, and Vin. Also, a current clockwise passes through a path extending along Lr1, C2, Cb of Q2, C1, R2, Cd of Q4, P1, and Lr1.

In a period T3, the capacitors Cb and Cd of the switching elements Q2 and Q4 discharge to make the potential of the switching elements Q2 and Q4 negative. When the negative potential reaches the forward voltages of the diodes Db and Dd of the switching elements Q2 and Q4, the diodes Db and Dd start to cause currents. At this time, a current clockwise passes through the path extending along Vin, L1, Db of Q2, C1, and Vin. Also, a current clockwise passes through a path extending along Lr1, C2, Db of Q2, C1, R2, Dd of Q4, P1, and Lr1.

In a period T4, the switching elements Q2 and Q4 simultaneously turn on and a current Q2i clockwise passes through the path extending along Vin, L1, Q2, C1, and Vin. Also, currents Q2i and Q4i clockwise pass through a path extending along Lri, C2, Q2, C1, R2, Q4, P1, and Lr1. Namely, the switching elements Q2 and Q4 achieve zero-voltage switching (ZVS).

In a period T5, a current clockwise passes through the path Vin, L1, Q2, C1, and Vin. Also, a current counterclockwise passes through the path extending along Lr1, P1, Q4, R2, C1, Q2, C2, and Lr1, to excite the reactor Lr1.

In a period T6, the switching elements Q2 and Q4 simultaneously turn off and the reactor Lr1 starts discharging the excitation energy thereof, to discharge the capacitors Ca and Cc of the switching elements Q1 and Q3. At this time, the discharge energy of the reactor L1 changes its flowing path. A current clockwise passes through the path extending along Vin, L1, C2, Lr1, P1, Cc of Q3, C1, and Vin. Also, a current clockwise passes through the path extending along Lr1, P1, Cc of Q3, C1, R1, Ca of Q1, C2, and Lr1.

In a period T7, the capacitors Ca and Cc of the switching elements Q1 and Q3 discharge to make the potential of the switching elements Q1 and Q3 negative. When the negative potential reaches the forward voltages of the diodes Da and Dc of the switching elements Q1 and Q3, the diodes Da and Dc allow to cause currents. At this time, a current clockwise passes through the path extending along Vin, L1, C2, Lr1, P1, Cc of Q3, C1, and Vin. Also a current clockwise passes through the path extending along Lr1, P1, Cc of Q3, C1, R1, Ca of Q1, C2, and Lr1.

In a period T8, the switching elements Q1 and Q3 simultaneously turn on and the reactor L1 starts to be excited with the DC power source Vin. At this time, a current clockwise passes through the path extending along Vin, L1, Q1, R1, and Vin. Also a current clockwise passes through a second current path extending along Lr1, P1, Q3, C1, R1, Q1, C2, and Lr1. Namely, the switching elements Q1 and Q3 achieve zero-voltage switching (ZVS). Thereafter, the reactor Lr1 and capacitor C2 resonate to invert the polarity of the second current path, and therefore, a current counterclockwise passes along Lr1, C2, Q1, R1, C1, Q3, P1, and Lr1.

In this way, the switching power source apparatus according to Embodiment 1 employs only the four switching elements Q1 to Q4, to realize compactness and low cost. The midpoints of the first and second arms are connected to each other through the primary winding P1 of the transformer T, the capacitor C2, and the reactor Lr1. This configuration always secures a regenerative current path with the use of the switching elements Q2 and Q4 serving as synchronous rectification switches and the diodes Da and Dc even during an OFF period of the switching elements Q1 and Q3 serving as main control switches. As results, the four switching elements Q1 to Q4 achieve zero-voltage switching to highly improve the efficiency of the switching power source apparatus. In the switching power source apparatus according to Embodiment 1, the first and second converters each carry out synchronous rectification to regenerate the excitation energy of the reactors through optional paths and realize the zero-voltage switching.

According to Embodiment 1, the first controller 11 and second controller 12 control outputs of their respective converters, to accurately stabilize the outputs. The drain-source voltage Vds of each of the switching elements Q1 to Q4, therefore, is clamped with the stable voltage Vo2 of the capacitor C1.

According to Embodiment 1, the first converter may be put in a no-load state and only the second converter may receive load. This realizes an active clamp circuit with the second converter serving as a main operation unit. In this case, the first converter carries out constant-voltage control, and therefore, the drain-source voltage Vds of each switch is maintained at a constant value, unlike an active clamp circuit according to a related art.

In FIG. 4, the simultaneous turning-on of the switching elements Q1 and Q3 and that of the switching elements Q2 and Q4 may each have a slight deviation in the simultaneity. Without regard to the slight deviation in the simultaneity, the switching elements Q1 and Q3 (Q2 and Q4) are able to achieve zero-voltage switching (ZVS) because a regenerative current, which must have sufficient energy to achieve the zero-voltage switching, automatically passes through a short path, i.e., a low-impedance path.

Embodiment 2

Figure 8:
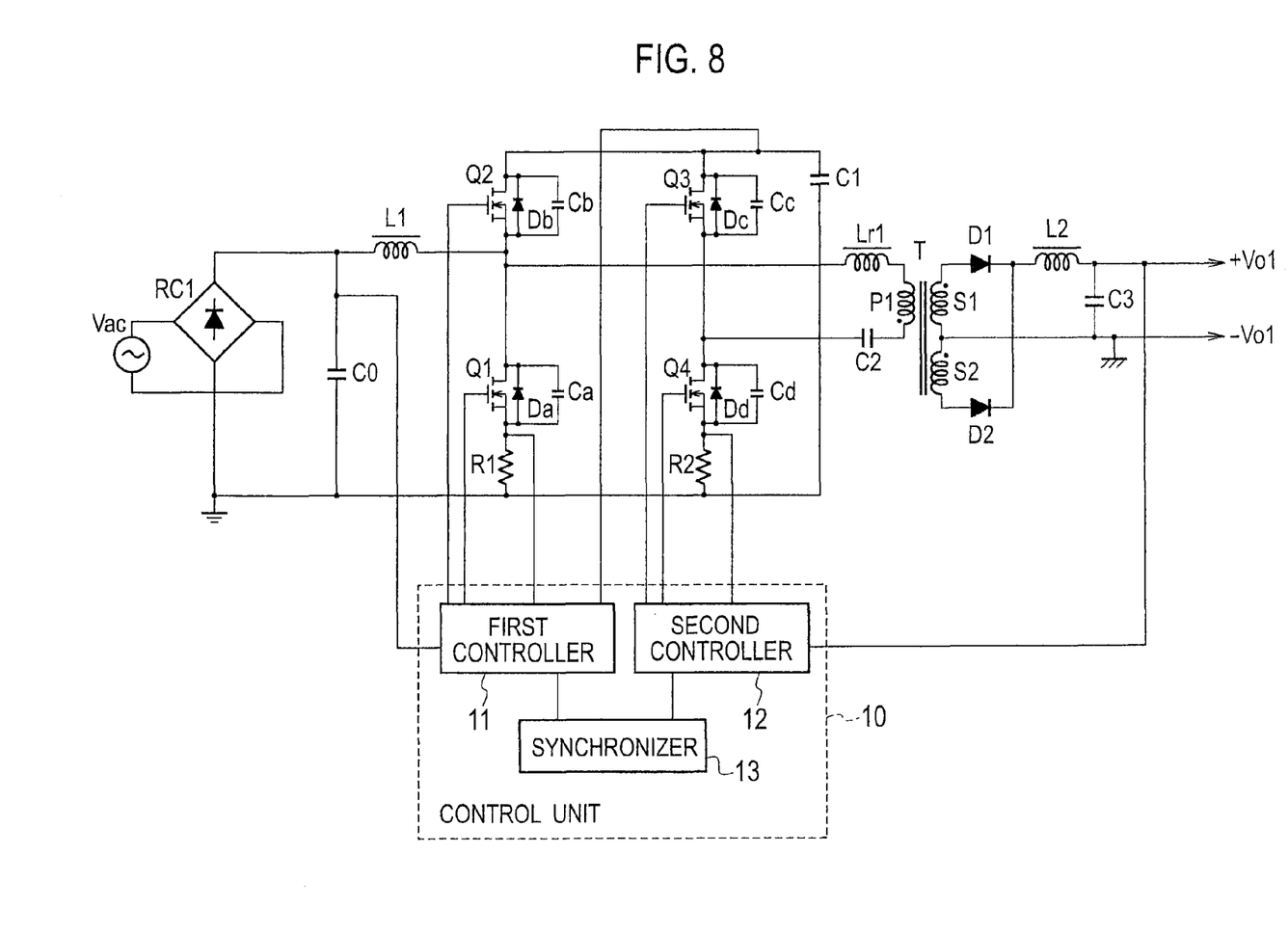
FIG. 8 is a schematic view illustrating a switching power source apparatus according to Embodiment 2 of the present invention.

FIG. 8 is a schematic view illustrating a switching power source apparatus according to Embodiment 2 of the present invention. Instead of the DC power source Vin of Embodiment 1 illustrated in FIG. 2, Embodiment 2 of FIG. 8 employs a PFC (power factor correction) circuit involving an AC power source Vac, a rectifier RC1, and a capacitor C0.

The AC power source Vac supplies an AC voltage to the rectifier RC1, which rectifies the AC voltage.

Both output ends of the rectifier RC1 are connected to the capacitor C0. A first controller 11 receives a voltage of the capacitor C0, multiplies the pulsating output voltage of the capacitor C0 by an output error voltage of a capacitor C1, and according to a result of the multiplication and a voltage from a current detecting resistor R1, equalizes an input AC current waveform with an input AC voltage waveform, thereby correcting a power factor.

With this configuration, the switching power source apparatus according to Embodiment 2 corrects a power factor, operates like the switching power source apparatus according to Embodiment 1, and provides effects similar to those provided by Embodiment 1.

According to Embodiment 2, the capacitor C0 and a reactor L1 work as an LC filter to reduce noise.

Embodiment 3

Figure 9:
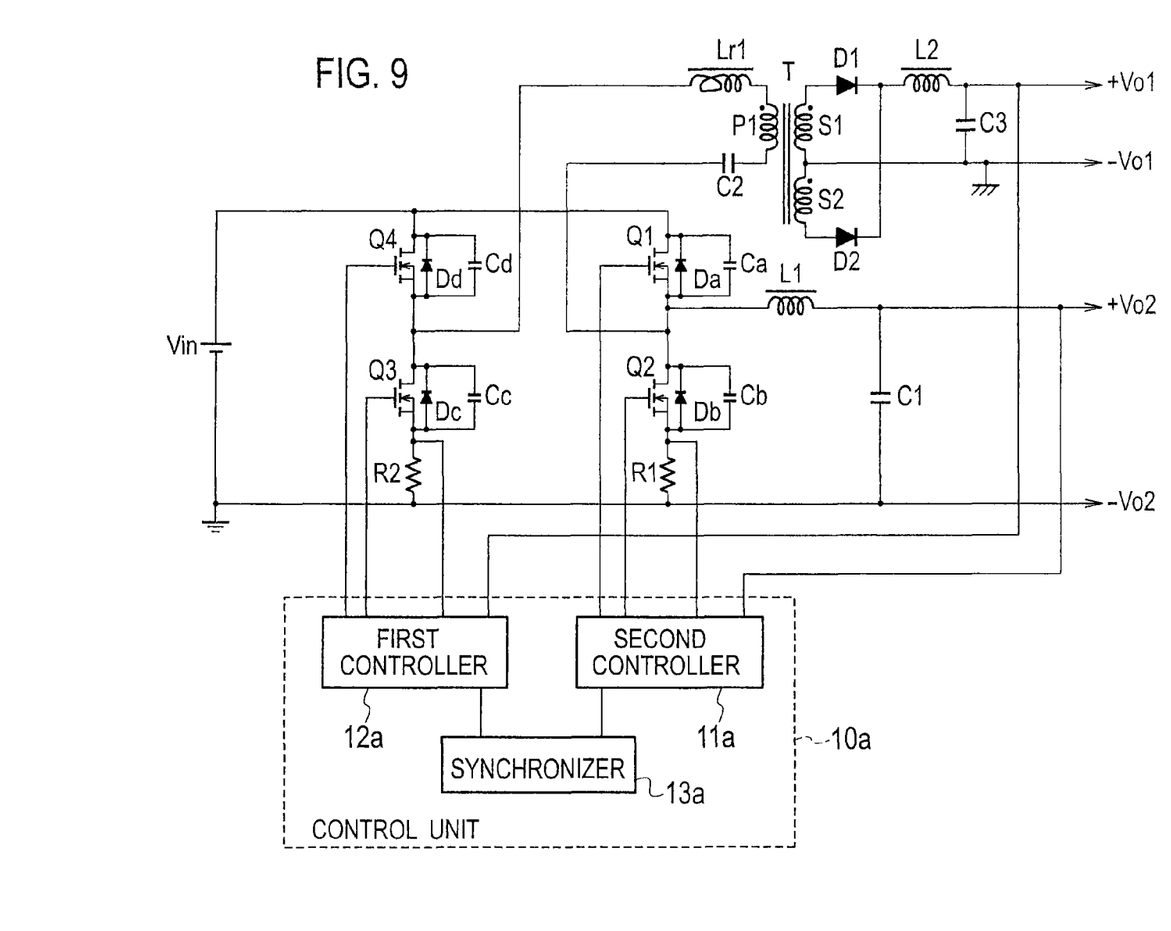
FIG. 9 is a schematic view illustrating a switching power source apparatus according to Embodiment 3 of the present invention.

FIG. 9 is a schematic view illustrating a switching power source apparatus according to Embodiment 3 of the present invention. This switching power source apparatus includes a non-insulated step-down circuit and an insulated circuit.

Both ends of a DC power source Vin are connected through a current detecting resistor R1 to a series circuit including a switching element Q1 serving as a main control switch and a switching element Q2 serving as an auxiliary control switch (synchronous rectification switch) and through a current detecting resistor R2 to a series circuit including a switching element Q3 serving as a main control switch and a switching element Q4 serving as an auxiliary control switch (synchronous rectification switch). Connected between a connection point of the switching elements Q1 and Q2 and a connection point of the switching elements Q3 and Q4 is a series circuit including a capacitor C2, a primary winding P1 of a transformer T, and a reactor Lr1. The secondary side of the transformer T has the same configuration as that of Embodiment 1.

A connection point of the switching elements Q1 and Q2 is connected to a series circuit including a reactor L1 and a capacitor C1. Both ends of the capacitor C1 provide an output voltage Vo2.

According to a voltage from the capacitor C1 and a voltage from the current detecting resistor R1, a first controller 11a turns on/off the switching elements Q1 and Q2 alternately, to carry out step-down control and provide the output voltage Vo2 that is a constant voltage lower than an input voltage from the DC power source Vin.

According to a voltage from a capacitor C3 and a voltage from a current detecting resistor R2, a second controller 12a turns on/off the switching elements Q3 and Q4 alternately, to provide a constant output voltage Vo1.

Figure 10:
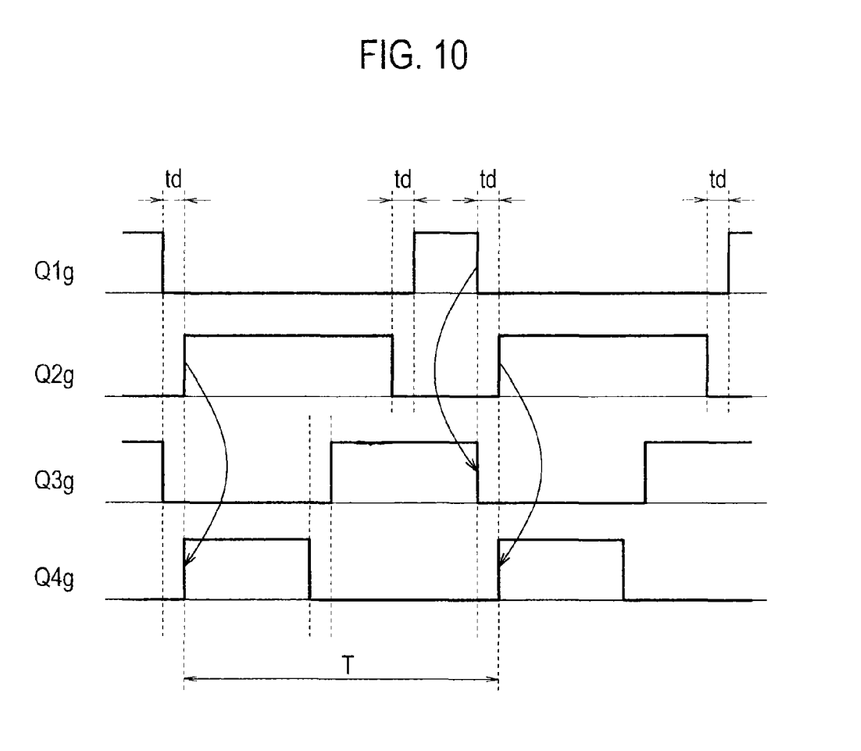
FIG. 10 is a timing chart illustrating operation at various locations in the switching power source apparatus of FIG. 9.

A synchronizer 13a synchronizes the operation timing of the first controller 11a with the operation timing of the second controller 12a. More precisely, as illustrated in FIG. 10, the synchronizer 13a synchronizes a falling edge of a gate signal Q1g for the switching element Q1 with a falling edge of a gate signal Q3g for the switching element Q3 and synchronizes a rising edge of a gate signal Q2g for the switching element Q2 with a rising edge of a gate signal Q4g for the switching element Q4. Namely, the switching elements Q1 and Q3 are a diagonal pair in a full-bridge circuit and the switching elements Q2 and Q4 are another diagonal pair in the full-bridge circuit.

A midpoint of a first arm of the switching elements Q1 and Q2 is connected to a midpoint of a second arm of the switching elements Q3 and Q4 through the primary winding P1 of the transformer T, the reactor Lr1, and the capacitor C2, so that the switching elements Q1 to Q4 may achieve zero-voltage switching (ZVS). The zero-voltage switching is achievable because, even in an OFF period of the main control switches Q1 and Q3, a path for passing a regenerative current is always secured through the synchronous rectification switches Q2 and Q4 and diodes Da and Dc.

The switching power source apparatus according to Embodiment 3 provides effects similar to those provided by Embodiment 1.

Embodiment 4

Figure 11:
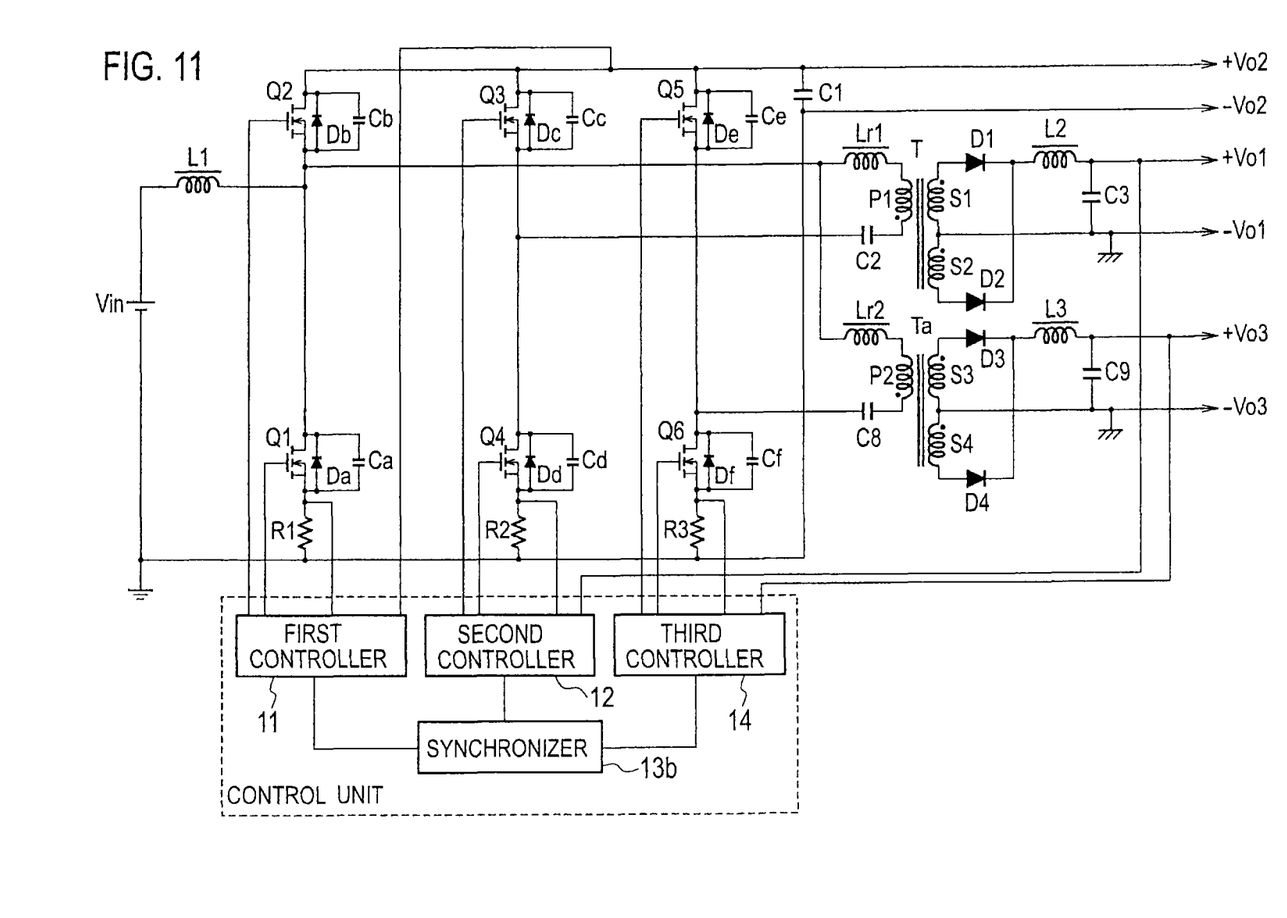
FIG. 11 is a schematic view illustrating a switching power source apparatus according to Embodiment 4 of the present invention.

FIG. 11 is a schematic view illustrating a switching power source apparatus according to Embodiment 4 of the present invention. Embodiment 4 differs from Embodiment 1 of FIG. 2 in that Embodiment 4 additionally connects a series circuit including switching elements Q5 and Q6 and a current detecting resistor R3 to both ends of a series circuit including switching elements Q3 and Q4 and a current detecting resistor R2. The switching elements Q5 and Q6 are a third arm.

The switching elements Q5 and Q6 are MOSFETs. Connected between drain and source of the switching element Q5 is a parallel circuit including a diode De and a capacitor Ce. Connected between drain and source of the switching element Q6 is a parallel circuit including a diode Df and a capacitor Cf. The diodes De and Df are flywheel diodes and may be parasitic diodes of the switching elements Q5 and Q6, respectively. The capacitors Ce and Cf are resonant capacitors and may be parasitic capacitors of the switching elements Q5 and Q6, respectively.

Connected between a connection point of the switching elements Q1 and Q2 and a connection point of the switching elements Q5 and Q6 is a series circuit including a capacitor C8, a primary winding P2 of a transformer Ta, and a reactor Lr2. The reactor Lr2 may be a leakage inductance between the primary winding P2 and secondary windings S3 and S4 of the transformer Ta.

The secondary windings S3 and S4 of the transformer Ta are connected in series. A first end of the secondary winding S3 is connected to an anode of a diode D3. A first end of the secondary winding S4 is connected to an anode of a diode D4. Cathodes of the diodes D3 and D4 are connected to a first end of a reactor L3. A second end of the reactor L3 is connected to a first end of a capacitor C9. A second end of the capacitor C9 is connected to a connection point of the secondary windings S3 and S4. The capacitor C9 provides an output voltage Vo3. The diodes D3 and D4, reactor L3, and capacitor C9 work as a rectifying-smoothing circuit.

According to a voltage from the capacitor C9 and a voltage from the current detecting resistor R3, a third controller 14 turns on/off the switching elements Q5 and Q6 alternately to provide the constant output voltage Vo3.

Figure 12:
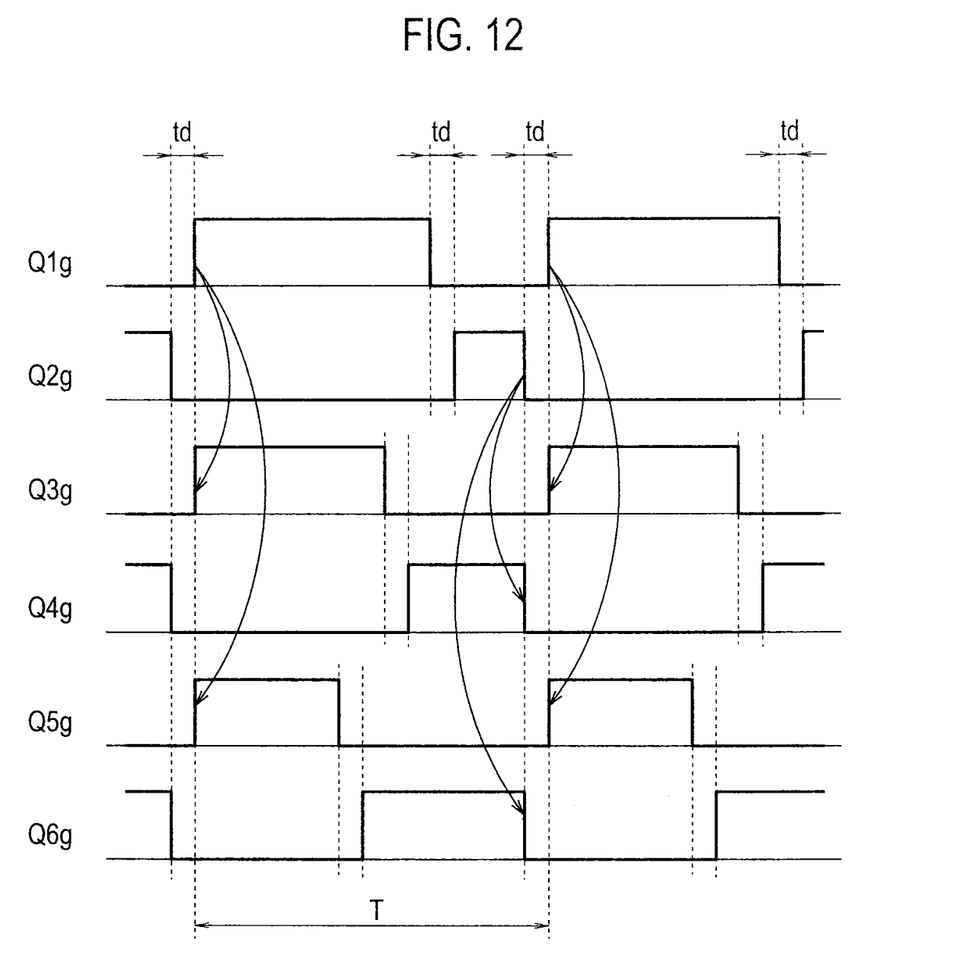
FIG. 12 is a timing chart illustrating operation at various locations in the switching power source apparatus of FIG. 11.

A synchronizer 13b synchronizes the operation timing of the first, second, and third controllers 11, 12, and 14 with one another. More precisely, as illustrated in FIG. 12, the synchronizer 13b synchronizes a rising edge of a gate signal Q1g for the switching element Q1, a rising edge of a gate signal Q3g for the switching element Q3, and a rising edge of a gate signal Q5g for the switching element Q5 with one another and synchronizes a falling edge of a gate signal Q2g for the switching element Q2, a falling edge of a gate signal Q4g for the switching element Q4, and a falling edge of a gate signal Q6g for the switching element Q6 with one another.

A midpoint of a first arm made of the switching elements Q1 and Q2 is connected to a midpoint of a second arm made of the switching elements Q3 and Q4 through a primary winding P1 of a transformer T, a reactor Lr1, and a capacitor C2, so that the switching elements Q1 to Q4 may achieve zero-voltage switching (ZVS).

A midpoint of the first arm made of the switching elements Q1 and Q2 is connected to a midpoint of the third arm made of the switching elements Q5 and Q6 through the primary winding P2 of the transformer Ta, the reactor Lr2, and the capacitor C8, so that the switching elements Q1, Q2, Q5, and Q6 may achieve zero-voltage switching (ZVS).

In this way, the switching power source apparatus according to Embodiment 4 outputs three voltages Vo1, Vo2, and Vo3 and provides effects similar to those provided by Embodiment 1.

In summary, the switching power source apparatus according to the present invention employs at least first to fourth switching elements to realize compactness and low cost. The apparatus connects midpoints of first and second arms each made of two of the switching elements to each other through a primary winding of a transformer and a capacitor, to always secure a path for a regenerative current by use of the second and fourth switching elements and flywheel diodes even during an OFF period of the first and third switching elements. With this configuration, the apparatus realizes zero-voltage switching of the four switching elements to improve efficiency.

The present invention is applicable to DC-DC converters, power factor correction circuits, AC-DC converters, and the like.

This application claims benefit of priority under 35USC §119 to Japanese Patent Application No. 2011-120114, filed on May 30, 2011, the entire contents of which are incorporated by reference herein.

What is claimed is:

1. A switching power source apparatus comprising:
a first arm including a first switching element and a second switching element connected in series with the first switching element;
a second arm connected in parallel with the first arm and including a third switching element and a fourth switching element connected in series with the third switching element, the first and third switching elements being diagonal to each other, and the second and fourth switching elements being diagonal to each other;
a first series circuit connected between a connection point of the first and second switching elements and a connection point of the third and fourth switching elements and including a first capacitor and a primary winding of a transformer connected in series with the first capacitor;
a first rectifying-smoothing circuit configured to rectify and smooth a voltage of a secondary winding of the transformer and provide a first output voltage;
a first reactor connected to a connection point of the first and second switching elements and one of DC input and output ends; and
a controller that turns on/off the first and second switching elements alternately, turns on/off the third and fourth switching elements alternately, synchronizes the first and third switching elements with each other, and synchronizes the second and fourth switching elements with each other.

2. The switching power source apparatus of claim 1, wherein the primary winding of the transformer is connected to a second reactor that is a leakage inductance between the primary and secondary windings of the transformer.

3. The switching power source apparatus of claim 1, wherein the controller synchronizes a signal for turning on the first switching element with a signal for turning on the third switching element and synchronizes a signal for turning off the second switching element with a signal for turning off the fourth switching element.

4. The switching power source apparatus of claim 1, wherein the controller synchronizes a signal for turning off the first switching element with a signal for turning off the third switching element and synchronizes a signal for turning on the second switching element with a signal for turning on the fourth switching element.

5. The switching power source apparatus of claim 1, wherein:
the DC input end of the first reactor is connected to a DC power source;
the DC power source includes an AC power source and a rectifying circuit; and
the controller carries out power factor correcting control.

6. The switching power source apparatus of claim 1, further comprising a second capacitor that is connected to both ends of the series circuit of the third and fourth switching elements and provides a second output voltage.

* * * * *